(12) United States Patent
Liu et al.

(10) Patent No.: US 8,866,397 B2
(45) Date of Patent: Oct. 21, 2014

(54) LIGHTING BATTERY

(75) Inventors: Xu Liu, Guangdong (CN); Yixian Chen, Guangdong (CN); Shizhou Qiu, Guangdong (CN)

(73) Assignee: Guangzhou Tiger Head Battery Group Co., Ltd., Guangzhou (CN)

(*) Notice: Subject to any disclaimer, the term of this patent is extended or adjusted under 35 U.S.C. 154(b) by 225 days.

(21) Appl. No.: 13/338,979

(22) Filed: Dec. 28, 2011

(65) Prior Publication Data
US 2012/0262083 A1    Oct. 18, 2012

(30) Foreign Application Priority Data

Apr. 14, 2011   (CN) .......................... 2011 1 0093170

(51) Int. Cl.
*H05B 39/02* (2006.01)
*H01M 10/48* (2006.01)
*H01M 2/02* (2006.01)
*H01M 10/42* (2006.01)

(52) U.S. Cl.
CPC ............ *H01M 2/022* (2013.01); *H01M 10/488* (2013.01); *Y02E 60/12* (2013.01); *H01M 10/425* (2013.01)
USPC ..................................................... 315/209 R

(58) Field of Classification Search
USPC .... 315/291, 185 R, 185 S, 209 R, 246, 241 P, 315/241 S, 244
See application file for complete search history.

(56) References Cited

U.S. PATENT DOCUMENTS

| | | | |
|---|---|---|---|
| 5,027,150 A * | 6/1991 | Inoue et al. ...................... 396/48 |
| 2005/0040773 A1* | 2/2005 | Lebens et al. .................. 315/291 |
| 2006/0203485 A1* | 9/2006 | Fu et al. ......................... 362/237 |
| 2007/0133199 A1* | 6/2007 | Lebens et al. ................. 362/157 |
| 2008/0059089 A1* | 3/2008 | Hornick et al. .................. 702/63 |
| 2010/0039049 A1* | 2/2010 | Hoffman ....................... 315/309 |
| 2011/0006697 A1* | 1/2011 | Huang et al. .................. 315/224 |

FOREIGN PATENT DOCUMENTS

CN          101545624         9/2009

* cited by examiner

*Primary Examiner* — Minh D A
(74) *Attorney, Agent, or Firm* — Hamre, Schumann, Mueller & Larson, P.C.

(57) ABSTRACT

A lighting battery relates to a cylindrical rechargeable battery. The lighting battery comprises a battery body, a driving circuit, a switch and light-emitting diodes, wherein the switch is an inching switch, and the driving circuit has a trigger pin which is connected to the switch whereby a trigger signal is acquired to control the driving circuit operate or stop. The power pin and grounding pin of the driving circuit is respectively connected to the positive pole and the negative pole of the battery body, as well as the output pin of the driving circuit is connected to the light-emitting diodes.

10 Claims, 19 Drawing Sheets

LIGHTING BATTERY

FIELD OF THE INVENTION

The present invention relates to a cylindrical rechargeable battery.

BACKGROUND OF THE INVENTION

In Chinese patent named "LIGHTING BATTERY" (Chinese Patent Application Number: 200910059222, Publication Date: Sep. 30, 2009), a dry battery with a light-emitting device is disclosed, in the dry battery "the film light-emitting diodes which are connected to the positive and negative poles of the battery through the conductor are set up on the outer surface of the battery; or the miniature light-emitting diodes could be mounted in the end of the battery, which are connected to the positive and negative poles of the battery through the conductor . . . a driving circuit connected to the light-emitting diodes is set on the outer surface of the battery". The invention mentioned above makes the dry battery could be used as a simple illumination device through self-radiation, as well as display its residual capacity. However, as the switch of this battery is an elastic contact switch, the normal status of the switch is open circuit, and the switch position of the battery has to be pressed constantly during illumination period, which causes inconvenience in use. On the other hand, configuration of a self-locking switch or a toggle switch to an AA or AAA battery with small size in order to meet the requirement of long time illumination is impossible.

SUMMARY OF THE INVENTION

The present invention provides a lighting battery which is of standard size and could be operated simply. The lighting battery could emit light after a switch is pressed, and stop emitting light after the switch is pressed once more.

The lighting battery of the present invention comprises a battery body, a driving circuit, a switch and light-emitting diodes, wherein the switch is an inching switch, and the driving circuit has a trigger pin which is connected to the switch whereby a trigger signal is acquired to control the driving circuit operate or stop. The power pin and grounding pin of the driving circuit is respectively connected to the positive pole and the negative pole of the battery body, as well as the output pin of the driving circuit is connected to the light-emitting diodes.

One advantage of the present invention is that the status of emitting light or not of the light-emitting diodes is toggled alternately according to the trigger of the switch, therefore the switch position of the lighting battery need not be pressed constantly by users, which makes the usage more convenient. Another advantage of the present invention is that the operation current of the light-emitting diodes is sustained by the trigger circuit without flowing across the switch, therefore the switch could be made lighter and thinner, as well as more reliable and durable. Also, the present invention is easier to implement in a small size battery, without shape and size alteration of the previous battery.

The present invention is suitable for the lighting battery which is compatible with a cylindrical rechargeable battery on the aspects of shape, size and electrical properties. The lighting battery according to the present invention could be settled in the battery house of an electrical device the same as a traditional product. Also it could be independently used as a portable light source device in outdoor activities, rescue, entertainment and other occasions.

DETAILED DESCRIPTION OF THE PREFERRED EMBODIMENTS

Figure 1:
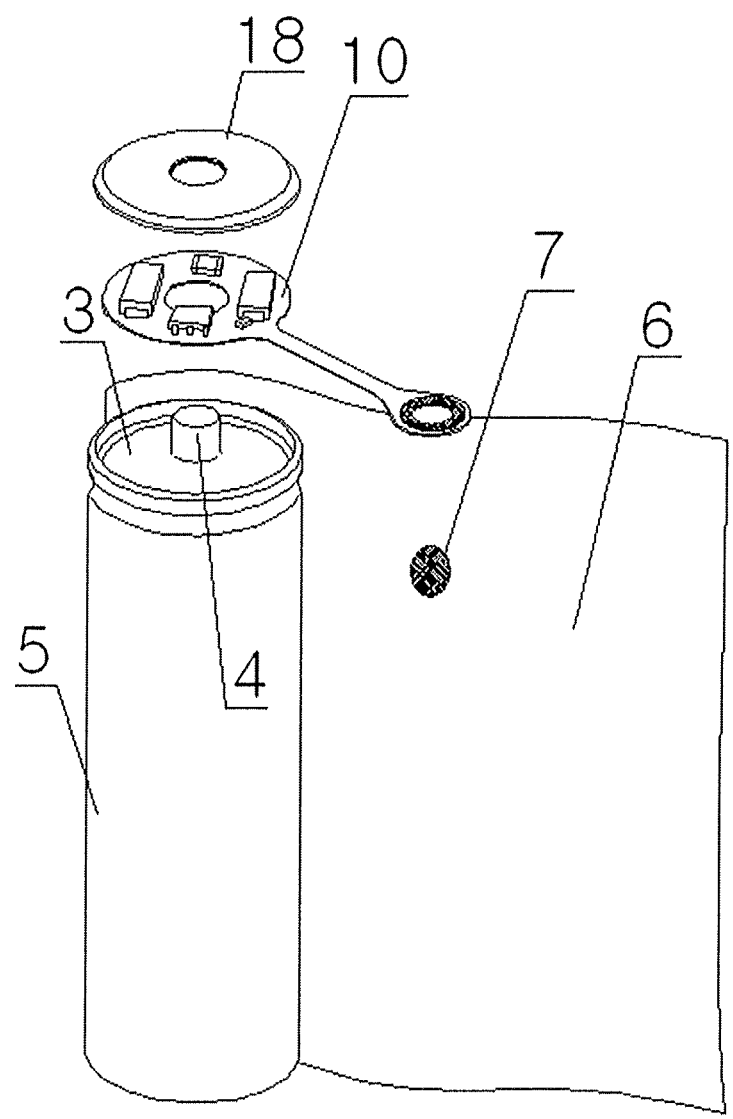
FIG. 1 is one of the exploded parts graphs of the first embodiment of the present invention.
Figure 2:
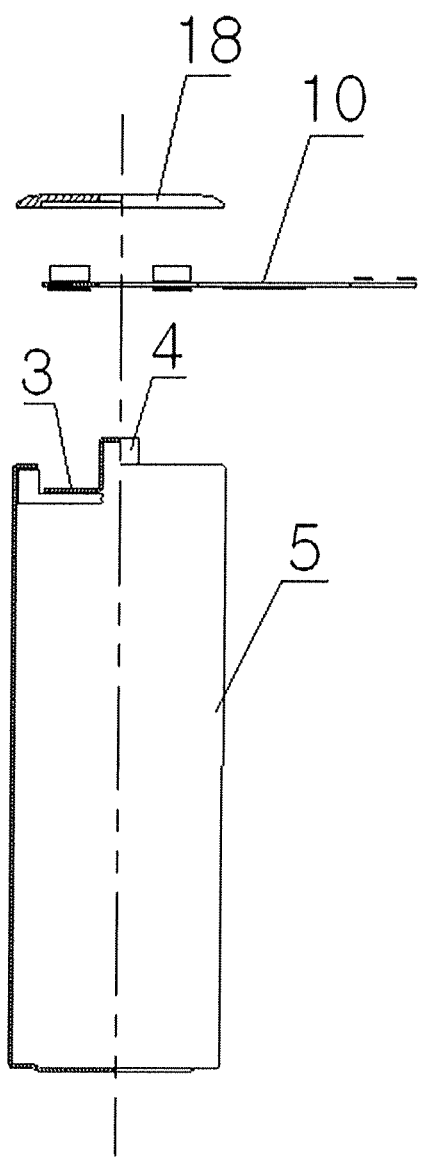
FIG. 2 is one of the structure graphs of the first embodiment of the present invention.
Figure 3:
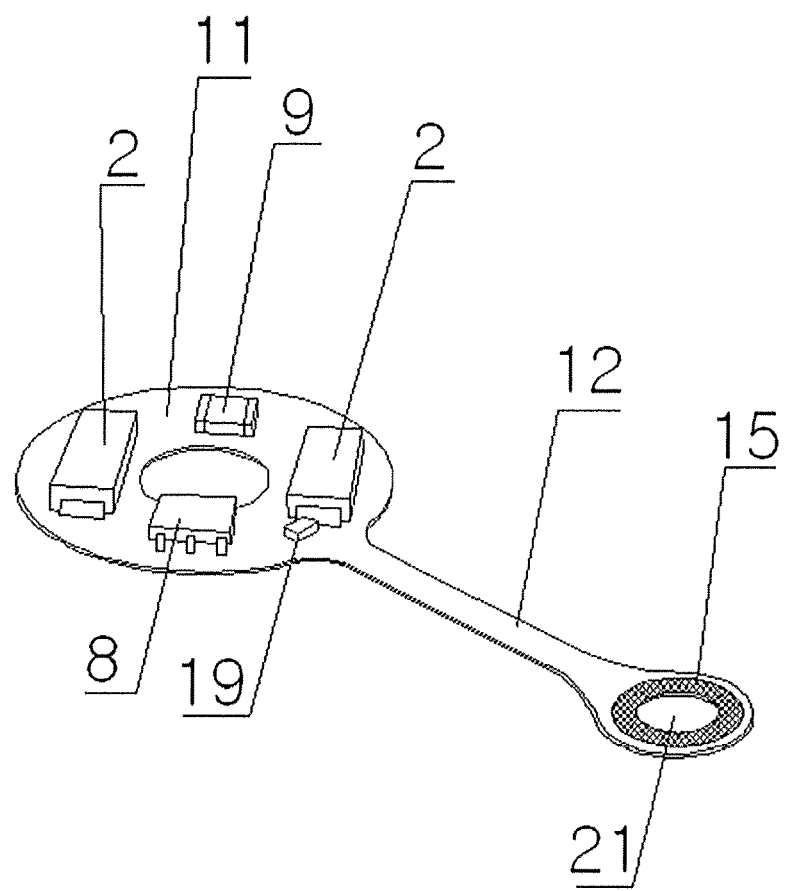
FIG. 3 is an appearance graph of the flexible printed circuit board of the first embodiment of the present invention.

Now, embodiments of the present invention will be described in detail by reference to the accompanying drawings.

Referring to FIGS. 1-7 and FIG. 10, the first embodiment of the present invention comprises a battery body, a driving circuit, a switch and two light-emitting diodes. The positive pole of the battery body is a metal cap 4 with a cap brim 3, and the negative pole is a metal cylinder 5 the bottom of which is closed. A self-adhesive battery trademark film 6 adheres closely to the outer surface of the metal cylinder 5. A first conductive region 7 of round shape is printed on the inner side of the self-adhesive battery trademark film 6 using conductive copper pulp, and a trademark Logo is printed on the outer surface of the self-adhesive battery trademark film 6. A contact indication icon 24 is set on the location of the outer surface corresponding to the first conductive region 7.

The driving circuit comprises an integrated circuit 8 with a trigger pin, an inductor 9 and a capacitor 19; the integrated circuit 8, the inductor 9, the capacitor 19 and two light-emitting diodes 2 are all welded to the top copper foil layer circuit of the flexible printed circuit board 10 which has double-layer copper foil layers.

The flexible printed circuit board 10 comprises a ring body 11 and a elongate tongue 12 which extends outward substantially along the radial direction from the boundary of the ring body 11. The ring body 11 of the flexible printed circuit board 10 surrounds the metal cap 4 and is settled on the cap brim 3, and the elongate tongue 12 is folded downward along the ektexine of the metal cylinder 5 from the opening of the metal cylinder 5. The elongate tongue 12 is wrapped by the self-adhesive battery trademark film 6 and close to the metal cylinder 5. The elongate tongue 12 has a ring shaped end, and the ring at the end of the elongate tongue 12 overlaps with the first conductive region 7 of round shape on the self-adhesive battery trademark film 6. The outside diameter of the ring at the end of the elongate tongue 12 is similar with the diameter of the first conductive region 7.

A second conductive region 13 connected to the power pin of the integrated circuit 8 is arranged on the bottom copper foil layer of the ring body 11 on the flexible printed circuit board 10, and the second conductive region 13 contacts with the cap brim 3 in order that the power pin of the integrated circuit 8 is connected to the positive pole. To ensure good conductivity, there is a conductive double-sided adhesive 17 between the cap brim 3 and the second conductive region 13. A third conductive region 14 connected to the grounding pin of the integrated circuit 8 is arranged on the bottom copper foil layer of the elongate tongue 12 on the flexible printed circuit board 10, the third conductive region 14 contacts with the metal cylinder 5 in order that the grounding pin of the integrated circuit 8 is connected to the negative pole. A fourth conductive region 15 of ring shape is arranged on the top copper foil layer of the ring at the end of the elongate tongue 12. The fourth conductive region 15 is connected to the trigger pin of the integrated circuit 8 and its outside diameter is slightly larger than the outside diameter of the first conductive region 7.

Figure 8:
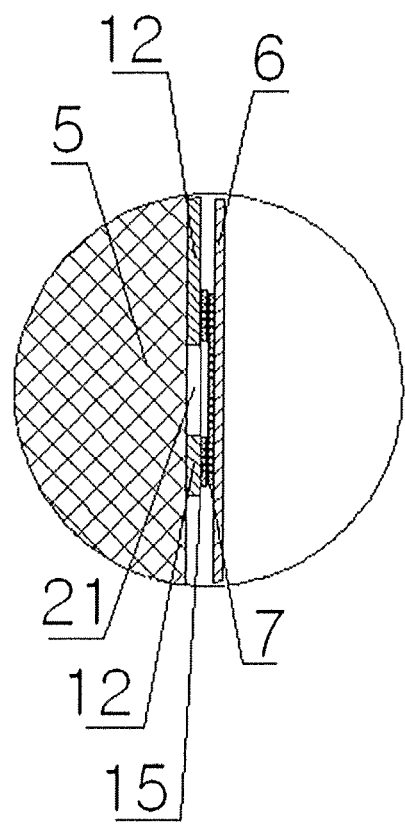
FIG. 8 is an enlarged graph of the area A in FIG. 7.
Figure 9:
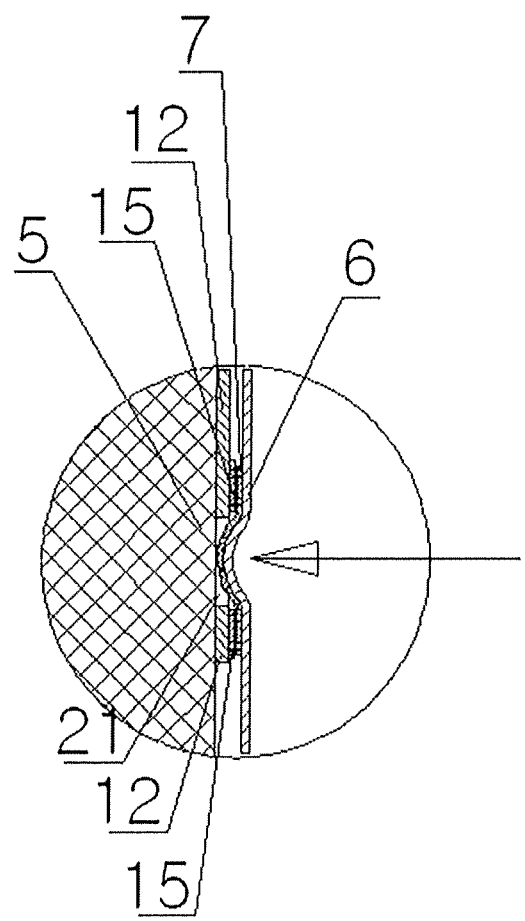
FIG. 9 is the switch structure graph of FIG. 8 during the self-adhesive battery trademark film being pressed.

Referring to FIGS. 8-9, the fourth conductive region 15, the metal cylinder 5 and the first conductive region 7 on the self-adhesive battery trademark film 6 compose a switch together, and part of the first conductive region 7 contacts with the fourth conductive region 15. When the location of the switch indication icon on the outer surface of the self-adhesive battery trademark film 6 is contacted and pressed by a finger, the rest part of the first conductive region 7 without contact with the fourth conductive region 15 is pushed towards the metal cylinder 5 through a ring hole 21, thus the trigger pin of the integrated circuit 8 is connected to the negative pole and therefore acquires a trigger signal, and then the integrated circuit 8 controls the driving circuit to operate or not.

Figure 10:
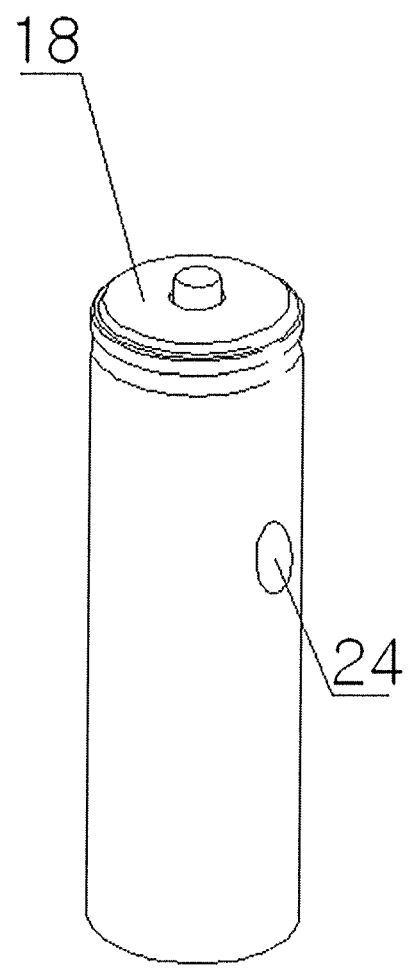
FIG. 10 is a appearance graph of the lighting battery being assembled.
Figure 11:
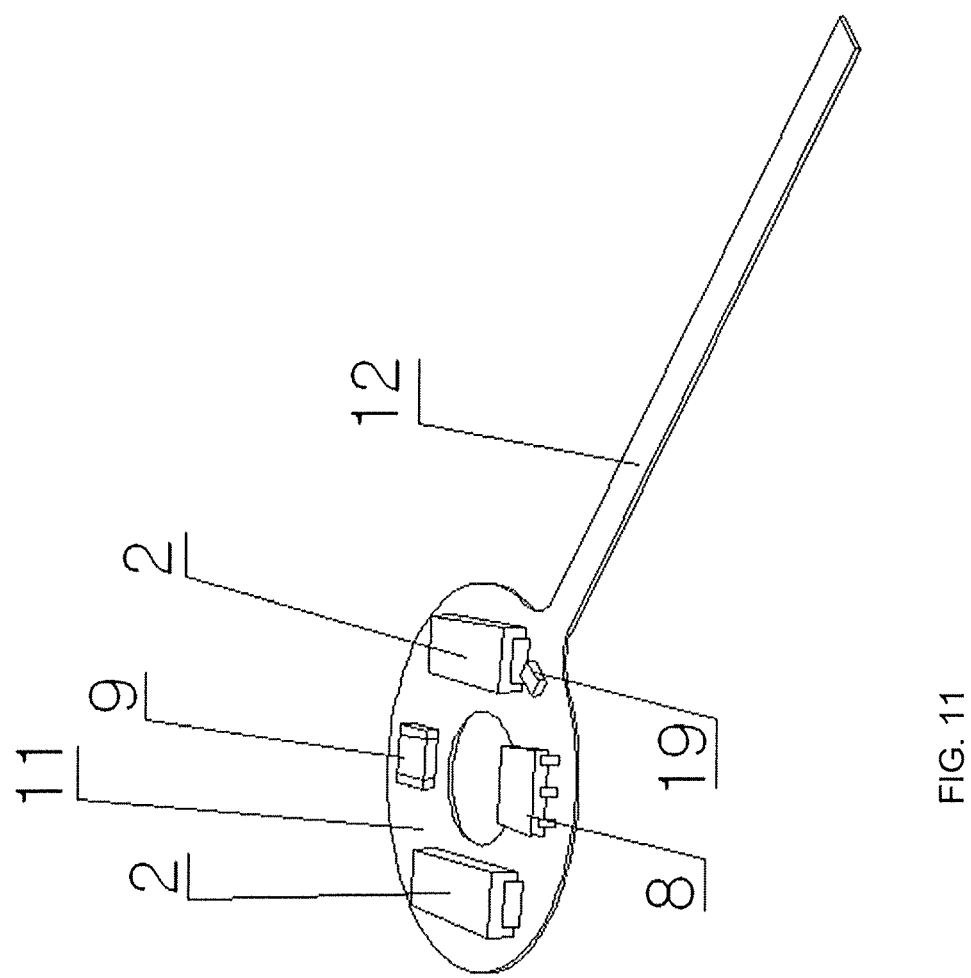
FIG. 11 is an appearance graph of the flexible printed circuit board of the second embodiment of the present invention.
Figure 12:
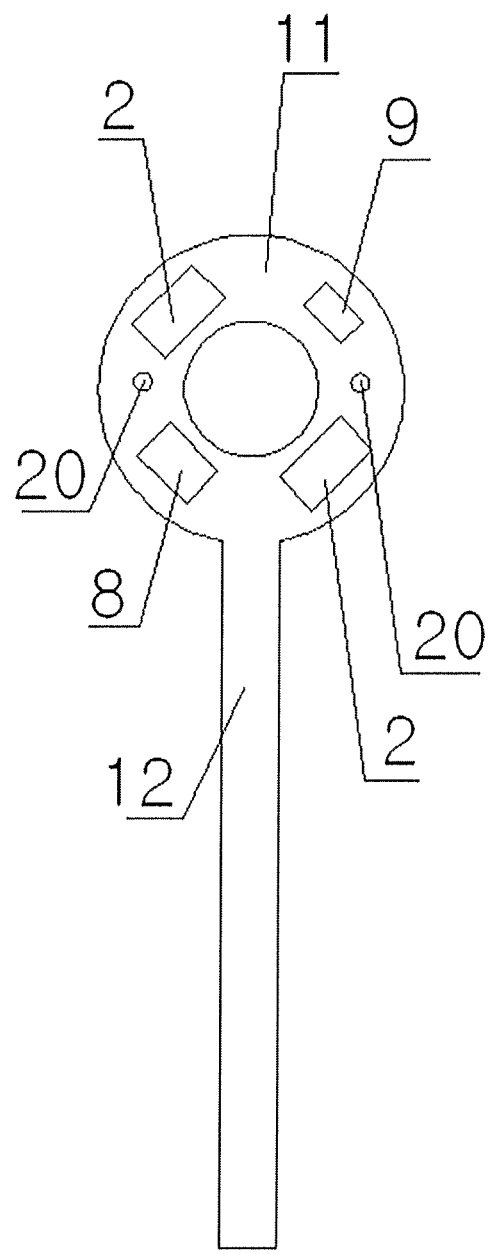
FIG. 12 is a plan graph of the flexible printed circuit board of the second embodiment of the present invention.
Figure 13:
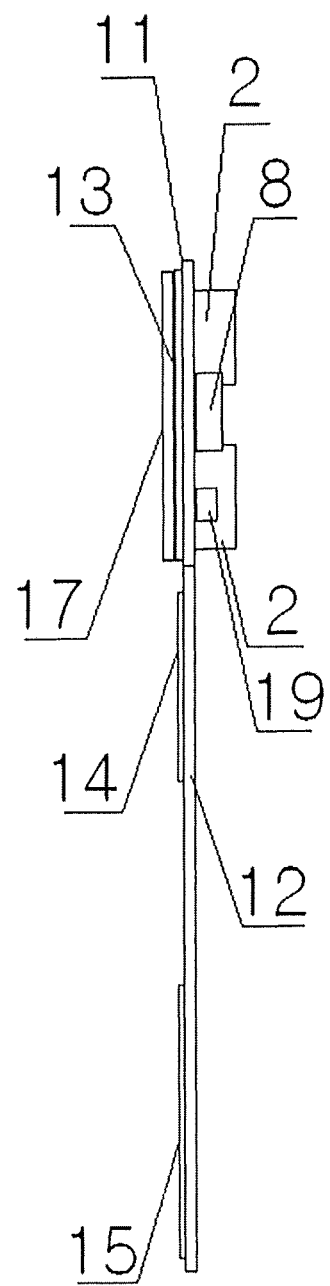
FIG. 13 is a left view graph of the flexible printed circuit board of the second embodiment of the present invention.
Figure 14:
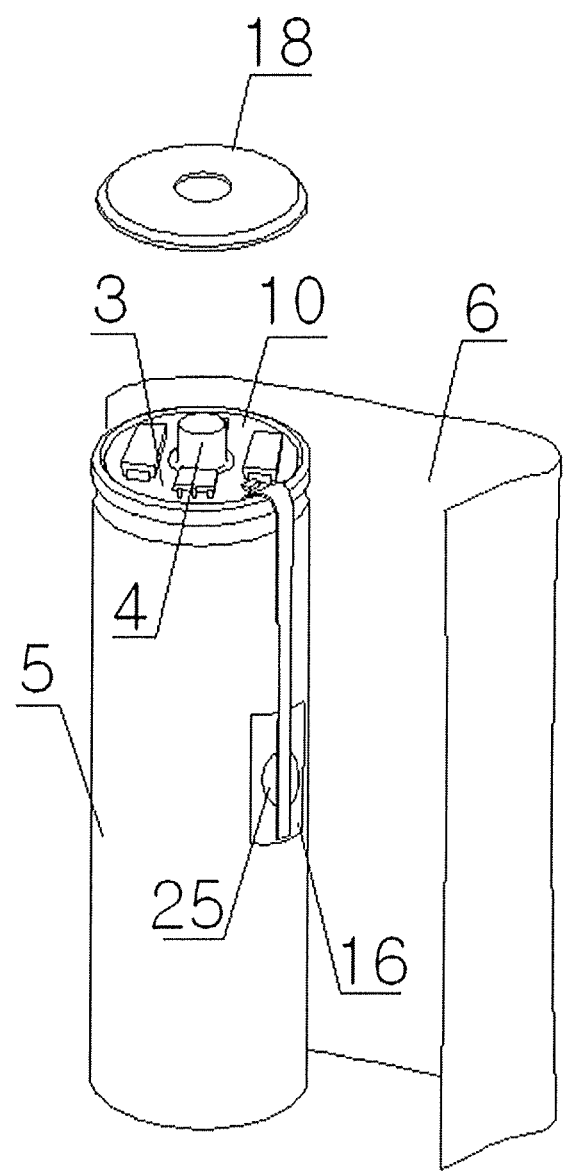
FIG. 14 is an exploded parts graph of the second embodiment of the present invention.
Figure 15:
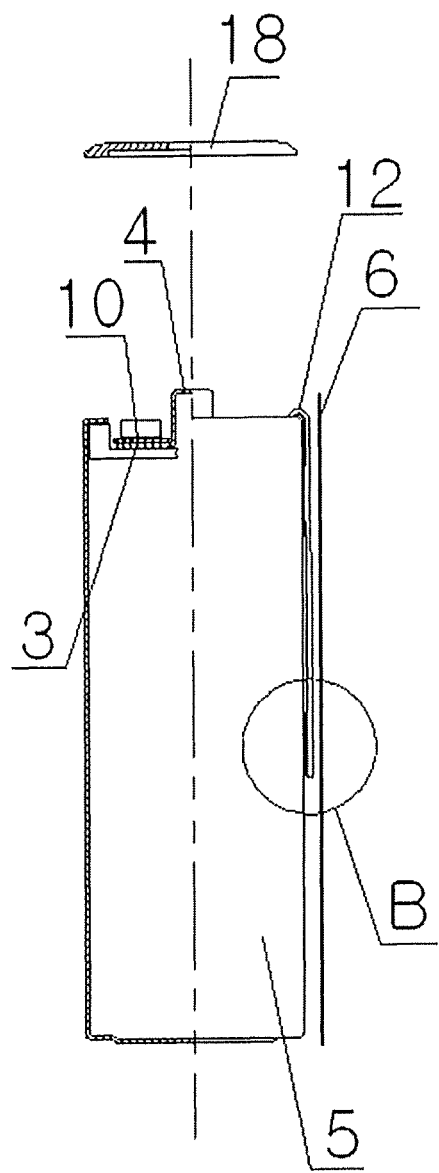
FIG. 15 is a structure graph of the second embodiment of the present invention.

Referring to FIG. 10, there is a protection cover 18 above the driving circuit at the top of the lighting battery which is made of transparent materials. Therefore, the lighting battery has identical configuration as a traditional battery, and is able to make light from the light-emitting diodes pass.

Figure 4:
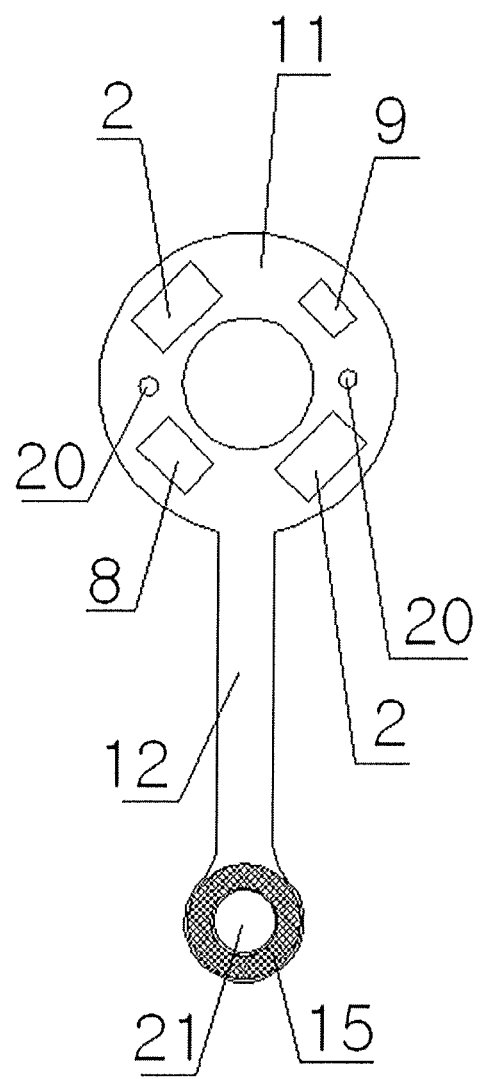
FIG. 4 is a plan graph of the flexible printed circuit board of the first embodiment of the present invention.
Figure 5:
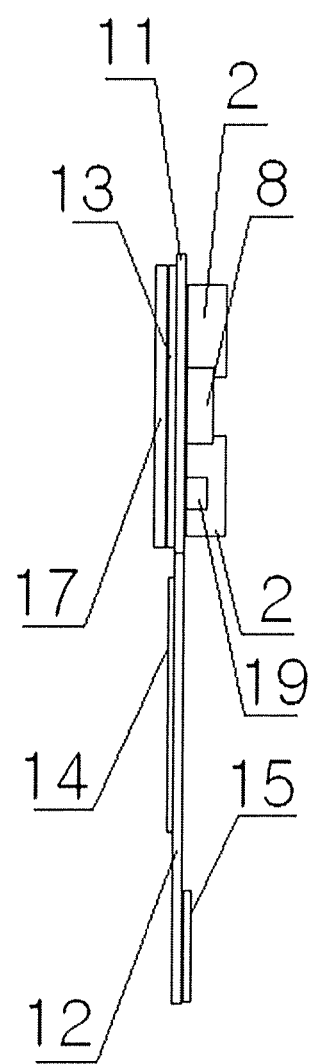
FIG. 5 is a left view graph of the flexible printed circuit board of the first embodiment of the present invention.
Figure 6:
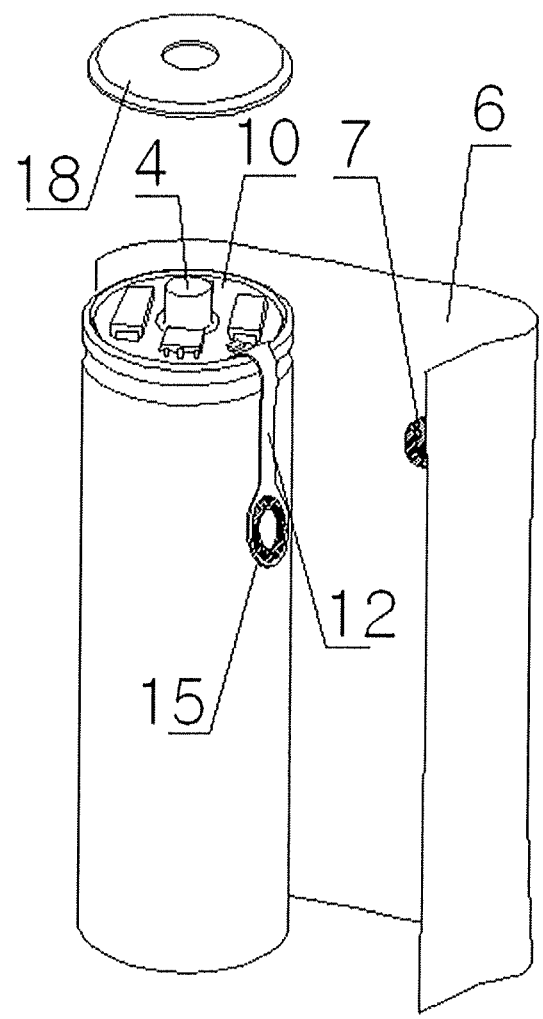
FIG. 6 is another exploded parts graph of the first embodiment of the present invention.
Figure 7:
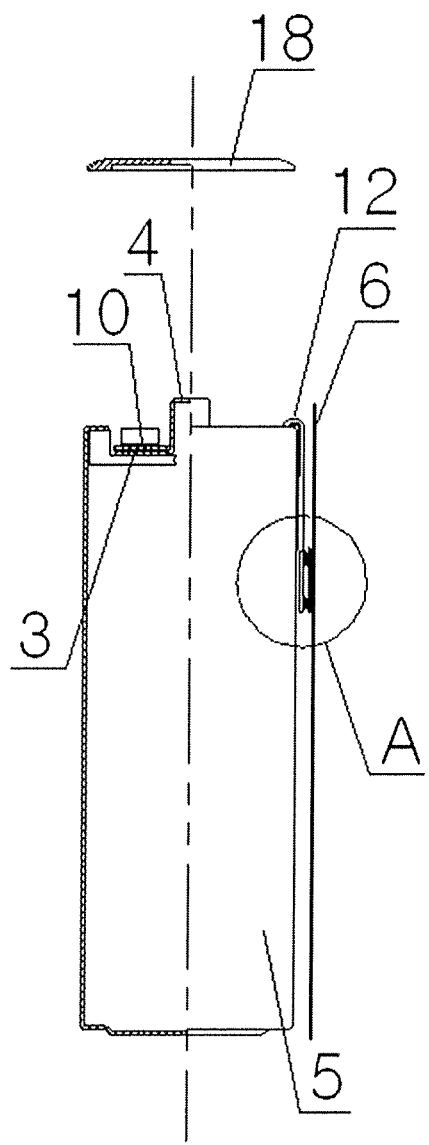
FIG. 7 is another structure graph of the first embodiment of the present invention.

Once more referring to FIG. 4, in a traditional rechargeable battery, the metal cap of the rechargeable battery has an exhaust hole for accident prevention during overcharge. In the present embodiment, two through holes 20 are arranged in the flexible printed circuit board 10, the position of which are corresponding to the position of the two exhaust holes in the battery body in order to avoid the flexible printed circuit board 10 blocking the exhaust holes.

Referring to FIGS. 11-15, the differences between the second embodiment of the present invention and the first embodiment are as follows: 1. the structure of the flexible printed circuit board in the second embodiment is different from the first embodiment; 2. the self-adhesive battery trademark film in the second embodiment isn't provided with the first conductive region of the first embodiment; 3. an insulated paper gasket 16 with a hole is arranged at the position of the metal cylinder covered by the end of the elongate tongue 12; and the end of the elongate tongue 12 is wrapped by the self-adhesive battery trademark film 6 and closely contacts to the insulated paper gasket 16 and passes through the hole 25 in the insulated paper gasket 16.

A second conductive region 13 connected to the power pin of the integrated circuit 8 is arranged on the bottom copper foil layer of the ring body 11 on the flexible printed circuit board 10, and the second conductive region 13 contacts with the cap brim 3 in order that the power pin of the integrated circuit 8 is connected to the positive pole. The elongate tongue 12 of the flexible printed circuit board is in long strip shape, and a third conductive region 14 connected to the grounding pin of the integrated circuit 8 and a fourth conductive region 15 connected to the trigger pin of the integrated circuit 8 are arranged on the bottom copper foil layer of the elongate tongue 12, wherein the third conductive region 14 is located at the front end of the elongate tongue, and the fourth conductive region 15 is located at the back end of the elongate tongue 12. The third conductive region 14 contacts with the metal cylinder 5 in order to connect the grounding pin of the integrated circuit 8 with the negative pole.

Figure 16:
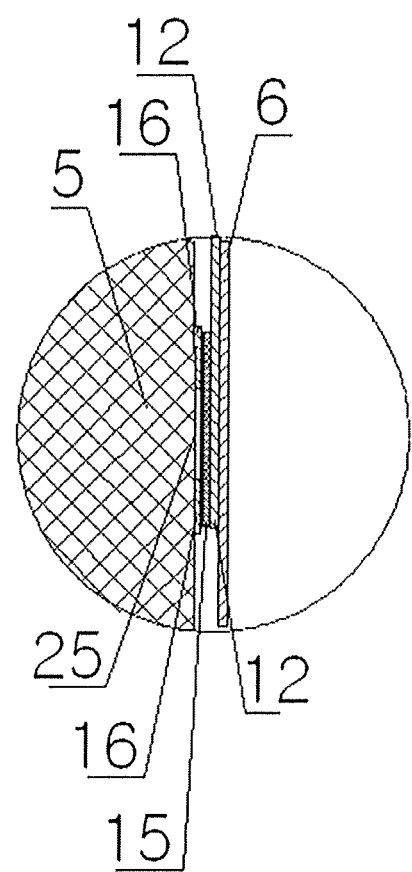
FIG. 16 is an enlarged graph of the area B in FIG. 15.
Figure 17:
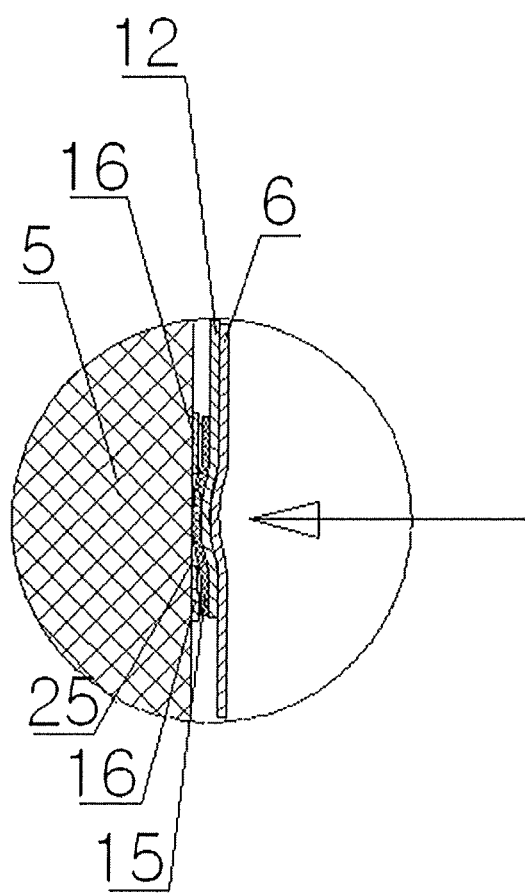
FIG. 17 is the switch structure graph of FIG. 16 during the self-adhesive battery trademark film being pressed.

Referring to FIGS. 16-17, the fourth conductive region 15 on the elongate tongue 12, the insulated paper gasket 16 and the metal cylinder 5 compose a switch together. When the self-adhesive battery trademark film 6 on the back side of the fourth conductive region 15 which is located at the position of the hole 25 in the insulated paper gasket 16 is pressed by a finger, part of the fourth conductive region 15 protrudes into the hole 25 and contacts with the metal cylinder 5, thus the trigger pin of the integrated circuit 8 is connected to the negative pole and therefore acquires a trigger signal, and then the integrated circuit 8 controls the driving circuit to operate or not.

Figure 18:
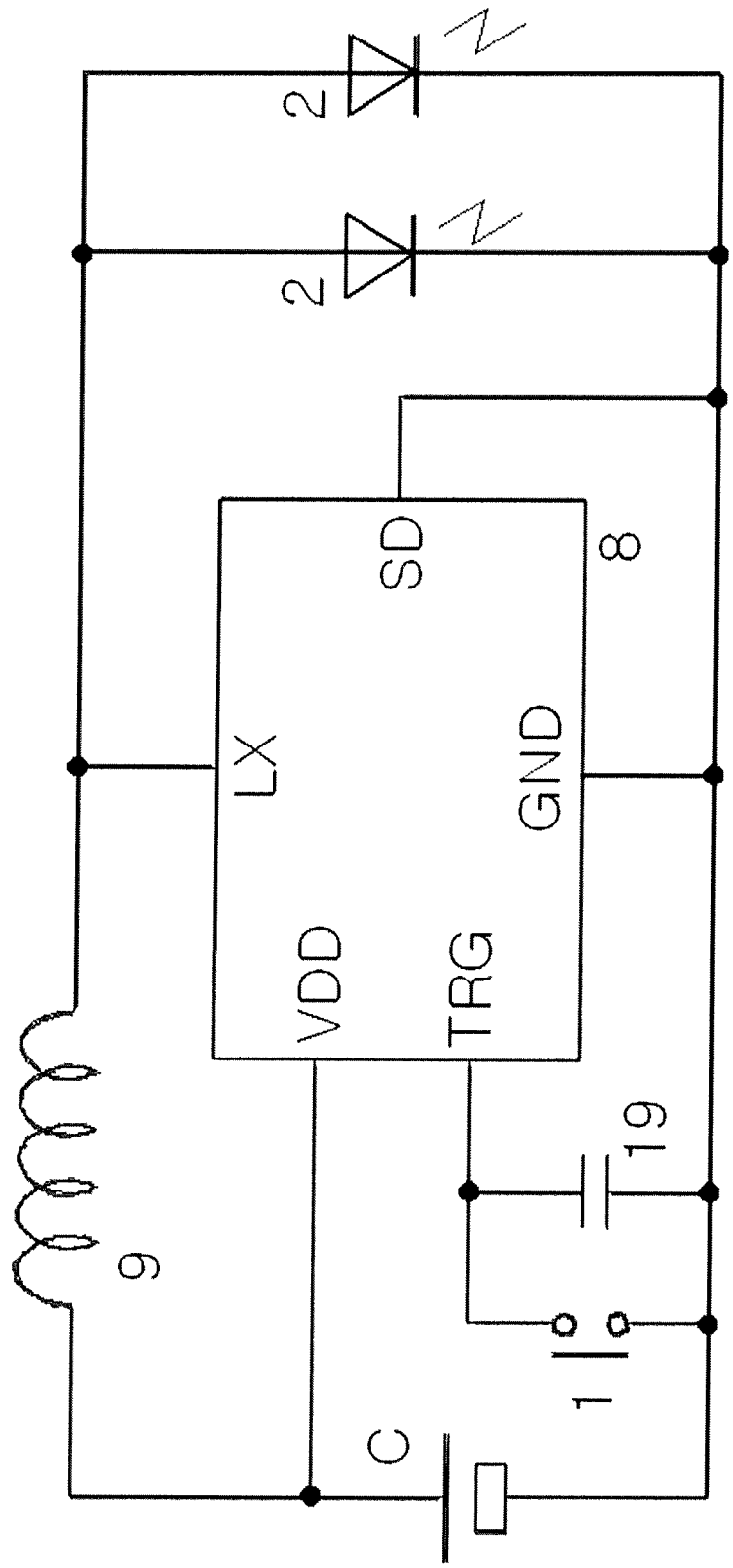
FIG. 18 is one of the electrical diagrams of the embodiments of the present invention.

Referring to FIG. 18, the driving circuit comprises an integrated circuit 8, an inductor 9, two light-emitting diodes 2 and a capacitor 19. The integrated circuit 8, the inductor 9, the light-emitting diodes 2 and the capacitor 19 are all surface mount devices. The driving circuit 8 is a step-up LED driving circuit with a trigger pin, which serves to work together with the energy storage inductor to raise the 1.2V voltage of the battery body C to a operation voltage suitable for the LED. The power pin VDD of the integrated circuit 8 is connected to the positive pole of the battery body C, and the grounding pin GND of the integrated battery 8 is connected to the negative pole of the battery body C in order to provide operation voltage to the integrated circuit 8. The trigger pin TRG of the integrated circuit 8 is connected to the switch 1, and the other side of the switch 1 is connected to the negative pole of the battery body C. The enabling pin SD of the integrated circuit 8 is connected to the negative pole of the battery body C in order to make the integrated circuit 8 operate in a bistability state. One side of the inductor 9 is connected to the positive pole of the battery body C, and the other side is connected to the output pin LX of the integrated circuit 8, both of the light-emitting diodes 2 are connected in parallel between the output pin LX and the grounding pin GND of the integrated circuit 8. The capacitor 19 is connected in parallel between the trigger pin TRG and the grounding pin GND of the integrated circuit 8 to eliminate the interference.

Figure 19:
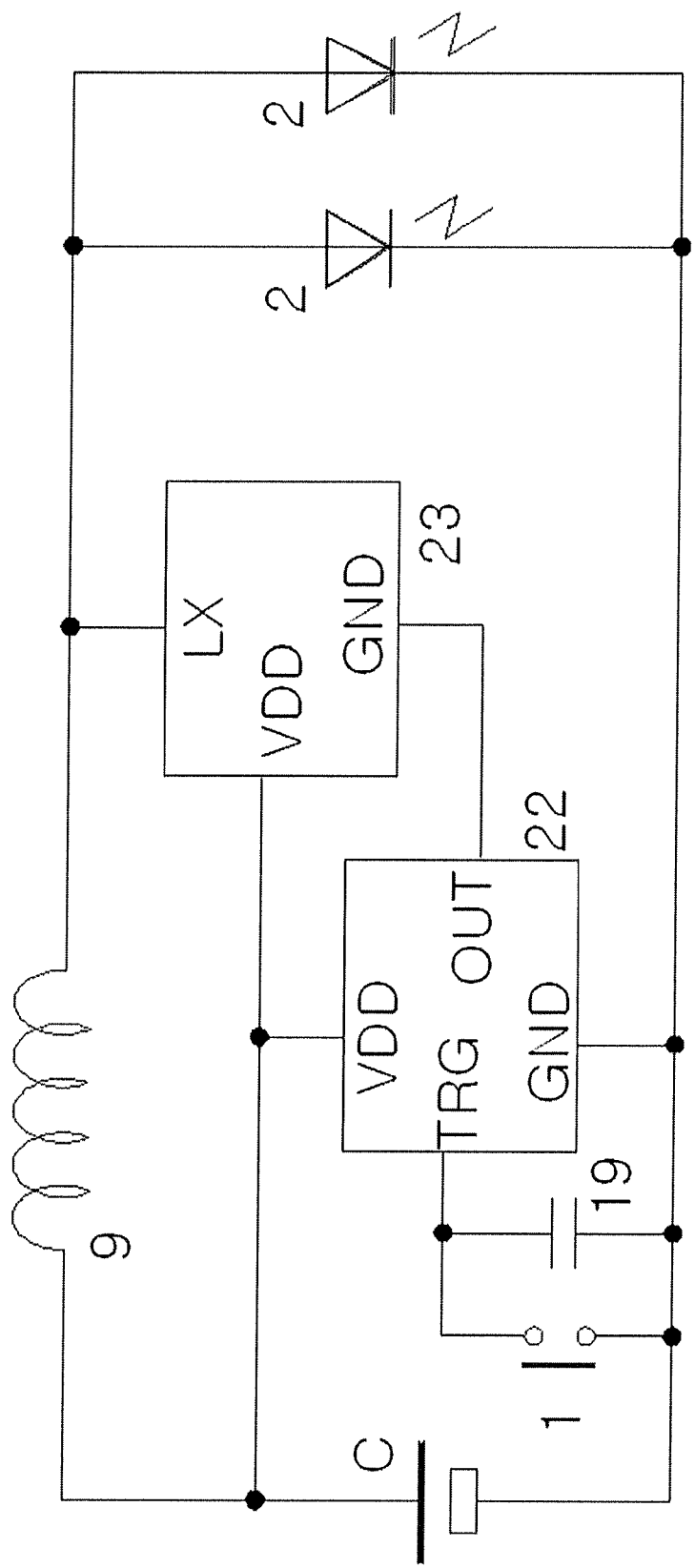
FIG. 19 is another electrical diagram of the embodiments of the present invention.

Other circuit structures could be used as the driving circuit of the present invention. Referring to FIG. 19, the difference between the FIG. 19 and the FIG. 18 is that two integrated circuits are utilized, i.e. the first integrated circuit 22 and the second integrated circuit 23. The second integrated circuit 23 is a triple terminal device, and it is also a step-up LED driving circuit which generates an output when power-on. The first integrated circuit 22 is a bistability trigger, the output pin of which is connected to the grounding pin of the second integrated circuit 23. When a low level is output from the output pin of the first integrated circuit 22, the second integrated circuit 23 is power-on and the LEDs emit light; and when a high level is output from the output pin of the first integrated circuit 22, the second integrated circuit 23 is power-off and the LEDs is lighting-off.

The invention claimed is:

1. A lighting battery comprising a cylindrical battery body, a driving circuit, a switch and light-emitting diodes, wherein
   the switch is an inching switch, and the driving circuit has a trigger pin which is connected to the switch whereby a trigger signal is acquired to control the driving circuit operate or stop, the power pin and grounding pin of the driving circuit is respectively connected to the positive pole and the negative pole of the battery body, and the output pin of the driving circuit is connected to the light-emitting diodes;
   the positive pole of the battery body is a metal cap with a cap brim, and the negative pole is a metal cylinder the bottom of which is closed, a self-adhesive battery trademark film adheres closely to the outer surface of the metal cylinder;
   a first conductive region of round shape is arranged on the inner side of the self-adhesive battery trademark film which is close to the metal cylinder;
   the driving circuit comprises an integrated circuit with a trigger pin and an inductor, the light-emitting diodes, the integrated circuit and the inductor are all welded to a top copper foil layer circuit of a flexible printed circuit board which has double-layer copper foil layers;
   the flexible printed circuit board comprises a ring body and a elongate tongue which extends outward substantially along the radial direction from the boundary of the ring body, the ring body of the flexible printed circuit board surrounds the metal cap and is settled on the cap brim, and the elongate tongue is folded downward along the ektexine of the metal cylinder from the opening of the metal cylinder, the elongate tongue is wrapped by the self-adhesive battery trademark film and close to the metal cylinder, and the end of the elongate tongue overlaps with the first conductive region of the self-adhesive battery trademark film;
   a second conductive region connected to the power pin of the integrated circuit is arranged on the bottom copper foil layer of the ring body on the flexible printed circuit board, and the second conductive region contacts with the cap brim via the conductive double-sided adhesive in order that the power pin of the integrated circuit is connected to the positive pole;
   a third conductive region connected to the grounding pin of the integrated circuit is arranged on the bottom copper foil layer of the elongate tongue on the flexible printed circuit board, the third conductive region contacts with the metal cylinder in order that the grounding pin of the integrated circuit is connected to the negative pole;
   a fourth conductive region connected to the trigger pin of the integrated circuit is arranged on the top copper foil layer of the ring at the end of the elongate tongue, and the fourth conductive region is a ring shaped region with a hole, the outside diameter of the fourth conductive region is slightly larger than the outside diameter of the first conductive region;
   a contact indication icon which has similar area with the first conductive region is printed on the surface of the self-adhesive battery trademark film corresponding to the location of the first conductive region on the other side; and
   the fourth conductive region, the metal cylinder and the first conductive region on the self-adhesive battery trademark film compose a switch together, and part of the first conductive region contacts with the fourth conductive region, the rest part of the first conductive region without contact with the fourth conductive region which is located corresponding to the hole contacts with the metal cylinder when the contact indication icon of the self-adhesive battery trademark film on the other side of the first conductive region is pressed by a finger, thus the trigger pin of the integrated circuit is connected to the negative pole.

2. A lighting battery as set forth in claim 1, wherein the end of the elongate tongue and the fourth conductive region are in ring shape, and the first conductive region is in round shape, and the diameter of the first conductive region is similar with the outside diameter of the ring at the end of the elongate tongue.

3. A lighting battery as set forth in claim 1, wherein the first conductive region is printed on the inner side of the self-adhesive battery trademark film-using conductive copper pulp.

4. A lighting battery as set forth in claim 1, wherein the driving circuit also comprises a capacitor, which is connected in parallel between the trigger pin and the grounding pin of the integrated circuit.

5. A lighting battery as set forth in claim 1, wherein a protection cover made of transparent materials is arranged at the top of the lighting battery, which surrounds above the driving circuit.

6. A lighting battery as set forth in claim 1, wherein one or more through holes are arranged in the flexible printed circuit board, the positions of which are corresponding to the positions of the exhaust holes in the battery body.

7. A lighting battery comprising a cylindrical battery body, a driving circuit, a switch and light-emitting diodes, wherein
   the switch is an inching switch, and the driving circuit has a trigger pin which is connected to the switch whereby a trigger signal is acquired to control the driving circuit operate or stop, the power pin and grounding pin of the driving circuit is respectively connected to the positive pole and the negative pole of the batter body, and the output pin of the driving circuit is connected to the light-emitting diodes;
   the positive pole of the battery body is a metal cap with a cap brim, and the negative pole is a metal cylinder the bottom of which is closed, a self-adhesive battery trademark film adheres closely to the outer surface of the metal cylinder;
   the driving circuit comprises an integrated circuit with a trigger pin and an inductor, the light-emitting diodes, the integrated circuit and the inductor are all welded to a top copper foil layer circuit of a flexible printed circuit board which has double-layer copper foil layers;
   the flexible printed circuit board comprises a ring body and a elongate tongue which extends outward substantially along the radial direction from the boundary of the ring body, the ring body of the flexible printed circuit board surrounds the metal cap and is settled on the cap brim, and the elongate tongue is folded downward along the ektexine of the metal cylinder from the opening of the metal cylinder, an insulated paper gasket with a hole is arranged at the position of the metal cylinder covered by the back end of the elongate tongue, the front end of the elongate tongue is wrapped by the self-adhesive battery trademark film and contacts closely to the metal cylinder, the back end of the elongate tongue is wrapped by the self-adhesive battery trademark film and closely contacts to the insulated paper gasket and passes through the hole in the insulated paper gasket;

a second conductive region connected to the power pin of the integrated circuit is arranged on the bottom copper foil layer of the ring body on the flexible printed circuit board, and the second conductive region contacts with the cap brim via the conductive double-sided adhesive in order that the power pin of the integrated circuit is connected to the positive pole;

a third conductive region connected to the grounding pin of the integrated circuit and a fourth conductive region connected to the trigger pin of the integrated circuit are arranged on the bottom copper foil layer of the elongate tongue on the flexible printed circuit board; and the third conductive region is located on the bottom layer end of the elongate tongue, and the fourth conductive region is located at the back end of the elongate tongue, the third conductive region contacts with the metal cylinder in order to connect the grounding pin of the integrated circuit with the negative pole; the fourth conductive region, the insulated paper gasket and the metal cylinder compose the switch together, and the fourth conductive region protrudes into the hole and contacts with the metal cylinder when the contact indication icon of the self-adhesive battery trademark film on the other side of the fourth conductive region which is located at the position of the hole in the insulated paper gasket is pressed by a finger, thus the trigger pin of the integrated circuit is connected to the negative pole.

8. A lighting battery as set forth in claim 7, wherein the driving circuit also comprises a capacitor, which is connected in parallel between the trigger pin and the grounding pin of the integrated circuit.

9. A lighting battery as set forth in claim 7, wherein a protection cover made of transparent materials is arranged at the top of the lighting battery, which surrounds above the driving circuit.

10. A lighting battery as set forth in claim 7, wherein one or more through holes are arranged in the flexible printed circuit board, the positions of which are corresponding to the positions of the exhaust holes in the battery body.

* * * * *